United States Patent [19]

Austin

[11] 4,191,687
[45] Mar. 4, 1980

[54] REACTIVE DYESTUFFS CONTAINING THE RESIDUE OF 1-HYDROXY-7-AMINO-8-(5'-AMINO-2',4'-DISULPHOPHENYLAZO)NAPHTHALENE-3,6-DISULPHONIC ACID

[75] Inventor: Peter W. Austin, Manchester, England

[73] Assignee: Imperial Chemical Industries Limited, England

[21] Appl. No.: 887,338

[22] Filed: Mar. 16, 1978

[30] Foreign Application Priority Data

Jun. 8, 1977 [GB] United Kingdom ............... 23909/77

[51] Int. Cl.² ...................... C09B 62/08; C09B 62/16; C09B 62/24; C09B 62/40
[52] U.S. Cl. ..................... 260/153; 260/154; 260/156; 260/158; 260/198
[58] Field of Search ............... 260/153, 154, 158, 156, 260/198

[56] References Cited

U.S. PATENT DOCUMENTS 3,642,765  2/1972  Oesterlein et al. ................ 260/153
3,853,840  12/1974  Schundehutte et al. ......... 260/146 D
4,036,825  7/1977  Fuchs et al. ..................... 260/196
4,066,638  1/1978  Fuchs et al. ..................... 260/196

FOREIGN PATENT DOCUMENTS 2315638 10/1974  Fed. Rep. of Germany .......... 260/153
1205016 9/1970  United Kingdom ................. 260/153

Primary Examiner—Floyd D. Higel
Attorney, Agent, or Firm—Cushman, Darby & Cushman

[57] ABSTRACT

Reactive dyestuffs of the formula:

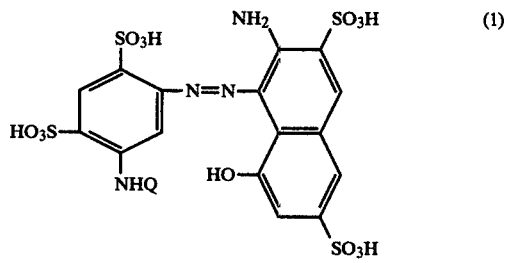

wherein Q represents a cellulose reactive group. Dyes can be used to color cellulose textiles in red shades having surprisingly good light fastness.

3 Claims, No Drawings

REACTIVE DYESTUFFS CONTAINING THE RESIDUE OF 1-HYDROXY-7-AMINO-8-(5'-AMINO-2',4'-DISULPHOPHENYLAZO)NAPHTHALENE-3,6-DISULPHONIC ACID

This invention relates to reactive dyes in particular to reactive dyestuffs containing the residue of 1-hydroxy-7-amino-8-(5'-amino-2',4'-disulphophenylazo)naphthalene-3,6-disulphonic acid.

U.K. Pat. Specification No. 1,205,016 discloses a class of reactive dyes characterised by the presence of a group of the formula

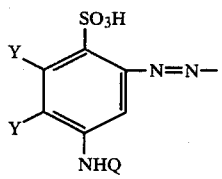

wherein one of Y is SO$_3$H and the other is H and Q is a cellulose reactive group. That specification discloses a variety of dyestuff types and mentions a number of possible coupling components including some capable of coupling at more than one position. Amongst such coupling components mentioned is 1-hydroxy-7-aminonaphthalene-3,6-disulphonic acid. However the specification gives no preference for mono- or disazo dyes from this coupling component. Nor does it suggest any preference for monoazo dyes with the azo group in one of the 2- or 8- positions rather than the other. Also the earlier document gives no basis to select either of the position isomer in the diazo component in preference to the other.

We have now found, surprisingly, that one of the four possible types of monoazo reactive dyes from the above coupling component shows much superior properties, e.g. light fastness, to the other three.

This type of monoazo reactive dyestuff is also found to show advantage over other closely related types such as those having only one SO$_3$H substituent on the phenyl azo residue or those from 1-hydroxy-8-aminonaphthalene-3,6-disulphonic acid as coupling component.

According to the present invention there is provided reactive dyestuffs of the formula

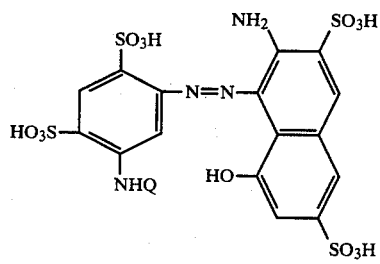

(1)

wherein Q represents a cellulose reactive group.

The cellulose reactive group Q is any group capable of forming a covalent bond with a cellulose substrate under alkaline conditions. The group Q may be any conventional cellulose reactive group of this type such as those disclosed in the patent specifications and other literature on reactive dyes, e.g. U.K. Pat. Specification No. 1,440,948.

As examples of cellulose-reactive groups, there may be mentioned aliphatic sulphonyl groups which contain a sulphate ester group in β-position to the sulphur atom, e.g. β-sulphatoethylsulphonyl groups, α,β-unsaturated acyl radicals of aliphatic carboxylic acids, for example acrylic acid, α-chloroacrylic acid, α-bromoacrylic acid, propiolic acid, maleic acid and mono- and dichloro maleic acids; also the acyl radicals of acids which contain a substituent which reacts with cellulose in the presence of an alkali, e.g. the radical of a halogenated aliphatic acid such as chloroacetic acid, β-chloro- and β-bromopropionic acids and α,β-dichloro- and di-bromopropionic acids or radicals of vinylsulphonyl- or β-chloroethylsulphonyl- or β-sulphatoethylsulphonyl-endo-methylene cyclohexane carboxylic acids. Other Examples of cellulose-reactive groups are tetrafluorocyclobutyl carbonyl, trifluorocyclobutenyl carbonyl, tetrafluorocyclobutylethenyl carbonyl, trifluorocyclobutenylethenyl carbonyl, and heterocyclic radicals which contain 2 or 3 nitrogen atoms in the heterocyclic ring and at least one cellulose-reactive substituent or a carbon atom of the ring.

It may be noted that many reactive groups may be defined as both heterocyclic or acyl groups since they consist of an acyl group carrying a heterocyclic substituent. For convenience in such cases where the heterocyclic ring carries the cellulose substituent these are usually referred to as heterocyclic reactive groups in this specification.

As examples of such heterocyclic racials there may be mentioned for example:
2:3-dichloroquinoxaline-5- or -6-sulphonyl,
2:3-dichloroquinoxaline-5- or -6-carbonyl,
2:4-dichloroquinazolin-6- or -7-sulphonyl,
2:4:6-trichloroquinazolin 7- or 8-sulphonyl,
2:4:7- or 2:4-8-trichloroquinazolin-6-sulphonyl,
2:4-dichloroquinazolin-6-carbonyl
1:4-dichlorophthalazine-6-carbonyl,
4:5-dichloropyridazon-1-yl-ethylcarbonyl
2:4-dichloropyrimidine-5-carbonyl,
4-(4':5'-dichloropyridaz-6'-on-1-yl)benzoyl,
2-chlorobenzthiazole-6-carbonyl
3,6-dichloropyrazin-4-carbonyl
4-(4':5'-dichloropyridaz-6'-on-1'-yl)phenylsulphonyl,
and more particularly triazinyl or pyrimidinyl groups.

Examples of particular pyrimidinyl groups are pyrimidin-2-yl or -4-yl groups having a cellulose reactive atom or group especially Cl, Br or F in at least one of the remaining 2, 4 and 6 positions. The 5-position may carry various substituents such as Cl or CN which are not normally cellulose reactive in themselves but may enhance the reactivity of substituents in other positions of the pyrimidine ring. As specific examples of such pyrimidinyl groups there may be mentioned:
2,6-dichloropyrimidin-4-yl,
4,6-dichloropyrimidin-2-yl,
2,5,6-trichloropyrimidin-4-yl,
4,5,6-trichloropyrimidin-2-yl,
5-chloro-2-methylsulphonyl-6-methyl-pyrimidin-4-yl
2,6-dichloro-5-cyanopyrimidin-4-yl,
4,6-dichloro-5-cyanopyrimidin-2-yl,
2,6-difluoro-5-chloropyrimidin-4-yl,
4,6-difluoro-5-chloropyrimidin-2-yl,
2,6difluoro-5-cyanopyrimidin-4-yl, 4,6-difluoro-5-cyanopyrimidin-2-yl Examples of particular triazinyl groups are triazin-2-yl groups having cellulose-reactive atoms or groups on one or both of the 4 and 6 positions. In this instance a wide range of cellulose-reactive atoms or groups are available such as activated aryloxy or various groups linked through a sulphur atom but the preferred reactive atoms or groups are F, Br or especially Cl, quaternary ammonium groups such as tri-lower alkyl ammonium, e.g. $(CH_3)_3N^+$- and pyridinium groups especially those derived from pyridine carboxylic acids in particular from nicotinic acid.

The triazinyl groups having only one reactive atom or group on the nucleus in the 4- or 6-position may have a substituent not reactive to cellulose in the remaining 4- or 6- position.

As examples of such non-reactive substituents there may be mentioned alkyl or aryl thio groups, alkoxy or aryloxy groups and optionally substituted amino groups.

Preferred forms of these groups include lower, i.e. $C_{1-4}$ alkoxy, e.g. methoxy, ethoxy, n-propoxy and isopropoxy, butoxy and lower alkoxy lower alkoxy, e.g. $\beta$-methoxy-ethoxy, $\beta$-ethoxyethoxy; phenoxy and sulphophenoxy; amino; lower alkylamino, e.g. methylamino, ethylamino, butylamino, di(lower alkyl) amino, e.g. dimethylamino, diethylamino, methylethylamino, dibutylamino and groups of the latter two types in which the alkyl groups are substituted in particular by OH, CN or $SO_3H$, e.g. $\beta$-hydroxyethylamino di($\beta$-hydroxyethyl)amino, $\beta$-cyanoethylamino, di($\beta$-cyanoethyl)amino, $\beta$-sulphoethylamino, $\beta$-hydroxypropylamino, ($\beta$-hydroxybutyl)ethylamino and ($\beta$-hydroxyethyl)-methylamino; cycloalkylamino, e.g. cyclohexylamino; cyclic amino, e.g. morpholino or piperazino; naphthylamino substituted by 1, 2 or 3 $SO_3H$ groups and optionally substituted phenyl amino groups.

As a particularly preferred form of theoptionally substituted phenylamino groups there may be mentioned groups of the formula:

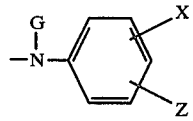
(2)

where G=H, methyl, ethyl, $\omega$-sulphomethyl, $\beta$-carboxy- $\beta$-hydroxy- or $\beta$-cyanoethyl and Z and X are each independently selected from H, COOH, $SO_3H$ $CH_3$, $C_2H_5$, $OCH_3$, $OC_2H_5$, Cl, Br, CN, $No_2$, $NHCOCH_3$.

As specific examples of such groups there may be mentioned anilino, o-, m- and p-sulphoanilino, o-, m- and p-carboxyanilino, 4- and 5-sulpho-2-carboxyanilino, 4- and 5-sulpho-o-tolylamino, 2,4-, 2,5- and 3,5- disulphoanilino, 2,4-dicarboxyanilino, 4- and 5-sulpho-2-methoxyanilino, N-methyl-o-, m- and p-sulphoanilino, N-$\omega$-sulphomethylanilino, N-($\beta$-hydroxyethyl)-3-sulphoanilino.

If desired, the cellulose-reactive group Q may take the form:

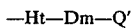

where Ht is a s-triazine nucleus which contains a cellulose-reactive atom or group, Dm represents a diamine residue linking Ht and Q' by the 2 amino groups and Q'
to a cellulose-reactive group having the meaning stated above for Q.

In particular it is usually preferred that the cellulose-reactive atom or group on Ht is F, Br or especially Cl and that Q' is a s-triazine residue as defined above for Q.

When symbol Q represents a s-triazine ring containing a halogen atom and a non-reactive substituent, the latter can be the residue of a coloured amine, e.g. of the azo, anthraquinone or phthalocyanine series, but more especially a residue of formula (1) less the group Q so that the dyestuff as a whole contains 2 residues of formula (1) less the group Q linked by a halo-striazine radical or 2 such residues linked through two halo-s-triazine groups and a diamine radical Dm as given above. In these dyestuffs the halogen may be F or Br but it is usually preferred that it is Cl.

As examples of the diamines $DmH_2$ which may provide the residue Dm there may be mentioned:
heterocyclic diamines e.g. piperazine,
aliphatic diamines e.g. alkylene-, hydroxyalkylene- or sulphato
alkylene diamines especially those having 2–6 carbon atoms, e.g. ethylene diamine
1,2 and 1,3-propylene diamines
1,6-diaminohexane
$\beta$-hydroxyethylaminoethylamine
2-hydroxy-1,3-diaminopropane
2-sulphato-1,3-diaminopropane
other $\alpha,\omega$-diamino aliphatic compounds e.g.
triethylene tetramine
di-($\beta$-aminoethyl)ether
naphthylene diamine sulphonic acids, e.g.
2,6-diaminonaphthalene-1,5- and 4,8-disulphonic acids
1,5-diaminonaphthalene-3,7-disulphonic acid
and diamine derivatives of mono- and di-cyclic compounds of the benzene series, e.g. phenylene diamines and their mono- and disulphonic acids, e.g. m- and p-phenylenediamines
1,3-phenylenediamine-5-sulphonic and 4,6-disulphonic acids,
1,4-phenylenediamine-2-sulphonic and 2,5-disulphonic acids,
diamines of the formula

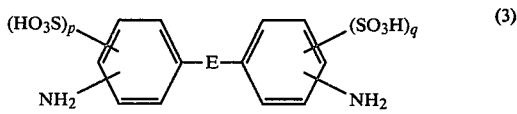

where p and q are each 0 or 1 and E is a direct link or a group selected from $SO_2$, $CH_2$, $C_2H_4$, NH, NHCONH, e.g.
4,4'-diaminostilbene-2,2'-disulphonic acid
benzidine-2-sulphonic and 2,2'-disulphonic acids
3,3'- and 4,4'-diaminodiphenylureas
4,4'-diaminodiphenylurea-2,2'- and 3,3'-disulphonic acids
4,4'-diaminodiphenylamine-2,2'-disulphonic acid
4,4'-diaminodiphenylmethane
4,4'-diaminodiphenylmethane-2,2'-disulphonic acid
4,4'-diaminodiphenyl sulphone and the N-lower alkyl and N,N'-di(lower alkyl) derivatives of the above diamines, e.g.
4-methylamino and 4-ethylaminoaniline-2-sulphonic acids N,N'-dimethyl-4,4'-diaminodiphenylamino-2,2'-disulphonic acid.

The present invention also provides a process for the manufacture of dyes of formula (1) other than those in which Q is β-sulphatoethylsulphonyl which comprises reacting an aminoazo compound

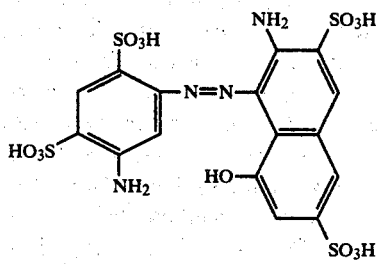

with a compound Qhal where Q is a cellulose-reactive group as defined above other than β-sulphatoethylsulphonyl and hal represents halogen.

The above process may be conveniently carried out in an aqueous medium desirably in the presence of an acid binding material, e.g. sodium carbonate, bicarbonate or hydroxide and at a temperature appropriate to the reactivity of the compound Qhal usually in the range 0°–100° C.

Specific examples of compounds Qhal will be apparent from the specific examples of Q given above. It is normally preferred that hal is chlorine, e.g. Q hal is β-chloropropionyl chloride, cyanuric chloride, methoxy dichloro-s-triazine, 2,4,5,6-tetrachloropyrimidine etc. but in some instances hal may be more conveniently another halogen, e.g. fluorine when this is the cellulose-reactive substituent present in Q, e.g. Qhal may be 2,4,6-trifluoro-5-chloropyrimidine to introduce the difluoro-5-chloropyrimidinyl group.

Dyes of formula (1) in which Q is β-sulphatoethylsulphonyl may be obtained by reacting an aminoazo compound of formula (4) with carbyl sulphate under the same general conditions as given above.

The aminoazo compound (4) may be obtained by coupling the diazonium salt from 3-nitro-4,6-disulphoaniline with 1-hydroxy-7-aminonaphthalene-3,6-disulphonic acid under acid conditions and reducing the resulting nitroazo compound, e.g. with sodium sulphide.

The present invention provides a further process for the manufacture of dyes of formula (1) which comprises coupling the diazonium salt from an amine of the formula

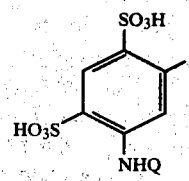

wherein Q is a cellulose-reactive group having the meaning given above, with 1-hydroxy-7-aminonaphthalene-3,6-disulphonic acid under acid conditions.

This process may be carried out under the conditions conventionally used for acid coupling reactions. For example the solution of diazotised amine at 0°–5° C. may be added to an aqueous acid solution of the 1-hydroxy-7-aminonaphthalene-3,6-disulphonic acid at 0°–30° C. and a pH of 1–3. It is often found desirable to gradually increase the pH of the reaction media to a value around 7 before isolating the product.

The amine (5) may be obtained by reacting 1,3-diaminobenzene-4,6-disulphonic acid with 1 mole of carbyl sulphate or a compound Qhal as described above in connection with the first process of the invention.

The diazonium compound of the amine of formula (5) may be obtained in any convenient conventional manner, e.g. treating it in acid aqueous solution at 0°–5° C. with sodium nitrite solution.

When the reactive group Q is to have the formula —Ht—Dm—Q' as defined above the reactant Qhal used in, or for preparing the intermediates for, the above processes has the formula

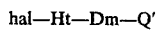
hal—Ht—Dm—Q'

This compound may be obtained by reacting a diamine DmH₂ with 1 mole of Q'hal and one mole of a s-triazine compound having the formula

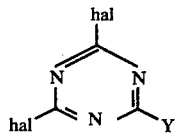

where Y is a cellulose-reactive substituent. In a preferred instance where Ht is a chloro-s-triazinyl group Y is Cl, i.e. the above s-triazine compound is cyanuric chloride.

The reactive dyes of formula (1) wherein the cellulose-reactive group Q is a s-triazine nucleus substituted by a Cl, Br or F atom and an amino or substituted amino group can also be obtained by reacting a dye of formula (1) in which Q is a dichloro-, dibromo- or difluoro-s-triazine group with ammonia or an amine.

This process can conveniently be carried out by stirring the reactants in an aqueous medium, optionally in the presence of a water-soluble organic solvent, at a temperature of from 30°–60° C., and preferably maintaining the pH at from 5–8 by adding an acid-binding agent to neutralise the hydrogen halide formed during the reaction. Suitable acid-binding agents are alkali metal hydroxides, carbonates and bicarbonates, or an excess or ammonia or aliphatic amine where this is one of the reactants.

Also, by use of a diamine in the proportion of 1 mole of diamine to 2 moles of the dichloro-, dibromo- or difluoro-s-triazinyl dye, the product obtained is of the kind mentioned above where the dyestuff as a whole contains 2 groups of formula (1) less Q, linked through two chloro-, bromo- or fluoro-s-triazine groups and a diamine radical. In the above process, there may be used any of the diamines DmH₂ mentioned above.

Alternatively, by reacting the dichloro-, dibromo- or difluoro-s-triazine dye with a diamine DmH₂ in equimolar proportion, the resulting product contains a free amino group and can be reacted with a compound of the formula Qhal as defined above whereby the dyestuff obtained contains a cellulose-reactive group of formula —Ht—Dm—Q' as defined above wherein Ht is chloro-, bromo- or fluorotriazinyl.

Dyestuffs of this kind can alternatively be obtained by first reacting the diamine with one mole of Qhal and reacting the resulting monoamine with one mole of dichloro-, dibromo- or difluoro-s-triazine dye.

In the above reactions where one mole of diamine is reacted with 1 mole of Qhal or with a dyestuff with a dichloro-, dibromo- or difluoro-s-triazinyl group it is usually preferred that the diamine has amino groups of different reactivity to minimise the concomitant formation of unwanted reaction products from 1 mole of the diamine with two moles of the other reactant.

In the instances where Q is a triazinyl group having quaternary ammonium or pyridinium substituents as the cellulose-reactive substituent these dyes may often be conveniently obtained by reacting the corresponding chloro-, bromo- or fluorotriazinyl dyestuff with the appropriate tertiary amine or pyridine compound. Such a reaction is normally carried out in aqueous media at 30° C. to 100° C.

The dyestuff prepared by the above processes may be isolated by any conventional means, e.g. spray drying or precipitation and filtration.

The dyes are represented above in their free acid form and may be isolated as such. However, it is usually found more convenient to isolate the dyes in the form of salts particularly alkali metal salts especially sodium.

The dyestuffs of the present invention may be used for colouring a wide range of textile materials containing hydroxyl or amino groups, e.g. wool, silk, synthetic polyamides and natural or regenerated cellulose, for example cotton or viscous rayon materials, by conventional methods used for colouring such materials with water-soluble reactive dyes, e.g. in the case of cellulose they are preferably applied in conjunction with a treatment with an acid-binding agent, e.g. caustic soda, sodium carbonate, phosphate, silicate or bicarbonate, which may be applied to the cellulose textile materials before, during or after the application of the dyestuff. The method, technique and conditions used for applying the dyestuff to the textile material will be selected according to various factors, e.g. the nature of the fibre or fibres present and the physical form of the textile material, for example, methods will vary depending on whether the fibre is loose or spun into thread which in turn may be in hanks or wound on bobbins or converted into cloth or garments by knitting or weaving. Any of the usual methods of dyeing or printing may be employed to apply the dye to the textile material and other dyestuffs and/or pigments may also be applied simultaneously or sequentially with the dyestuffs of the present invention using such combinations of conditions as are dictated by the properties of the dyestuffs and/or pigments. Such mixed dyeings are particularly valuable if the textile containing OH or $NH_2$ groups is blended with other textile fibres free from such groups e.g. polyesters. The dyeing may be carried out in a batchwise manner using, for example, exhaustion techniques in a beck, winch, jet, paddle or jig device, in particular for hanks, woven or knitted fabrics or garments; or it may be applied by a "package" dyeing technique to fibres wound in cakes or on cones, bobbins or warp beams, especially when these supports are perforated, or to loose fibres in permeable containers such as cages, pressure and/or vacuum may be employed to facilitate penetration and circulation through the packages. Alternatively, continuous or semi-continuous dyeing methods may be employed, such as those employing padding techniques, e.g. by padding mangles whereby the textile material is impregnated with dye liquor and then passed through rollers to control the amount of liquor retained, followed by one or more of a variety of post treatments e.g. drying, jig or winch development, baking, steaming, repadding in further solutions such as acid binding agents as mentioned above, storage in a moist conditions at ambient or elevated temperatures, passing over heated rollers or passing through batchwise or continuous washing procedures. These post treatments may also incorporate finishing stages at which for example antistatic or crease resistance agents can be incorporated. Textiles in sheet form may also be coloured by textile printing methods such as printing with engraved or embossed rollers or through screens or by transfer techniques such as wet transfer printing. Details of these and other suitable printing methods are described in "The Principles and Practise of Textile Printing" by E. Knecht, J. B. Fothergill and G. Hurst, 4th Edition 1952 published by Griffin or in "An Introduction to Textile Printing" by W. Clarke, 4th Edition 1974 published by Newnes Butterworth.

The new dyes of the present invention form a valuable class of red dyes and textiles coloured with these dyestuffs show good resistance to washing and other wet treatments. The present dyes also show surprisingly good light fastness and are much superior to many isomeric and closely related dyes in this respect.

The invention is illustrated by the following Examples in which all parts are by weight and proportions in wt/vol are g/100 ml.

EXAMPLE 1

4,6-Diaminobenzene-1,3-disulphonic acid (2.68 parts) are stirred in water (75 parts) at 0°–5° C. and the ph of the solution is adjusted to 4.5 by the dropwise addition of 2 N sodium carbonate solution. The solution so obtained is added in one portion to a stirred suspension of cyanuric chloride (2.1 parts), water (50 parts), ice (50 parts) and dispersing agent (1 part). The mixture is stirred at 0°–5° C. for two hours, the pH being maintained at 4.5 by the dropwise addition of 2 N sodium carbonate solution as required. Hydrochloric acid (S.G.=1.18, 4 parts) are added followed by the dropwise addition of 2 N sodium nitrite solution (5 parts). After stirring for 10 minutes at 0°–5° C., the slight excess of nitrous acid is destroyed by the addition of a few drops of 10% aqueous sulphamic acid solution. 7-Amino-1-hydroxynaphthalene-3,6-disulphonic acid (3.19 parts) are added and the mixture is stirred at 0°–5° C., pH 1-1.5 for 3 hours. Ammonia liquor (S.G.=0.880) is added until the pH of the red solution is 10 and it is heated to 40° C., pH 10 for 1 hour. The product is isolated by the addition of potassium acetate, collected by filtration and dried. When printed on cellulose fibres in conjunction with an acid-binding agent, bright bluish-red prints of excellent fastness to washing and light are produced. No staining of adjacent white is observed and the high light fastness is maintained even in pale shades.

The shades have moderate fastness to chlorine. The structure of the dyestuff prepared in this Example is

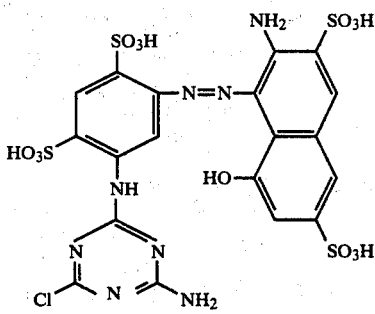

To illustrate the superiority of the dye of the present invention made in Example 1 over closely related dyes the following comparative dye preparations were made:

COMPARISON A

The 4,6-diaminobenzene-1,2-disulphonic acid of example 1 is replaced by an equivalent amount of 3,5-diaminobenzene-1,2-disulphonic acid, whereby a dyestuff is obtained with significantly duller shade and inferior light fastness to the dye described in example 1.

COMPARISON B 4,6-Diaminobenzene-1,3-disulphonic acid (2.68 parts) are reacted with cyanuric chloride (2.1 parts) and the product diazotised as described for example 1. The suspension of the diazonium salt is slowly added during ½ hour to a stirred solution of 7-amino-1-hydroxynaphthalene-3,6-disulphonic acid (3.19 parts) in water (100 parts) maintained at 0°–5°, pH 6. The solution is stirred at 0°–5°, pH 6 for a further ½ hour. Ammonia liquor (S.G.=0.880) is added until the pH of the brown solution is 10 and it is heated to 40° for 1 hour. The product is isolated by salting to 20% w/v with sodium chloride (at pH 9–10). When printed on cellulose fibres in conjunction with an acid-binding agent, brown prints of significantly inferior light and chlorinated water fastness to that of the dyestuff described in example 1 are obtained.

The structure of the dyestuff prepared in this example is

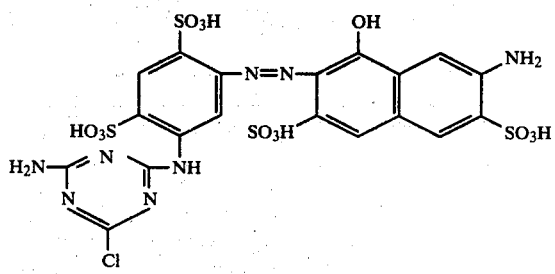

COMPARISON C

The 4,6-diaminobenzene-1,3-disulphonic acid of Comparison B is replaced by an equivalent amount of 3,5-diaminobenzene-1,2-disulphonic acid, whereby a dyestuff is obtained yielding brown prints on cellulose of significantly inferior light fastness to that of the dyestuff described in example 1.

COMPARISON D

The 4,6-diaminobenzene-1,3-disulphonic acid of example 1 is replaced by an equivalent amount of 2,4-diaminobenzene sulphonic acid, whereby a dyestuff is obtained which yields weak, dull, yellowish-red prints on cellulose with poorer staining properties and light fastness to that of the dyestuff described in example 1.

COMPARISON E

Replacement of the 7-amino-1-hydroxynaphthalene-3,6-disulphonic acid in example 1 by an equivalent quantity of 1-hydroxy-8-aminonaphthalene-3,6-disulphonic acid yields a dyestuff printing cellulose, in conjunction with an acid-binding agent, in bluish-red shades of significantly lower light fastness than that of the dyestuff described in example 1.

EXAMPLE 2

4,6-Diaminobenzene-1,3-disulphonic acid (2.68 parts) are reacted with cyanuric chloride (2.1 parts) and the product diazotised as described for example 1. 7-Amino-1-hydroxynaphthalene-3,6-disulphonic acid (3.19 parts) are added and the mixture is stirred at 0°–5°, pH 1–1.5 for 3 hours. 2 N Sodium carbonate solution is added until the pH of the solution is at 6–7. Metanilic acid (2 parts) is added and the solution is stirred at 30°–40°, pH 6–7 for ½ hour before the product is isolated by salting to 50% w/v with potassium acetate. When printed on cellulose fibres in conjunction with an acid-binding agent, bright bluish-red prints of excellent fastness to washing and light are produced. No staining of adjacent whites is observed and the high light fastness is maintained even in pale shades.

To illustrate the superiority of the dyestuff of Example 2 a closely related dyestuff was made and tested as follows:

Replacement of the 3.19 parts of 7-amino-1-hydroxynaphthalene-3,6-disulphonic acid in Example 2 by 2.39 parts of 7-amino-1-hydroxynaphthalene-3-sulphonic acid yields a dyestuff giving yellowish-red prints on cellulose with significantly inferior light fastness to that of the dyestuff described in example 2.

The examples in the following Table can be prepared similarly to Example 2, the metanilic acid of Example 2 being replaced by an equivalent quantity of the compound named in Column II. All the dyestuffs yield bluish-red shades with similar properties to Example 2 when applied to cellulosic fibres in conjunction with an acid-binding agent.

| I | II |
|---|---|
| 3 | sulphanilic acid |
| 4 | aniline |
| 5 | 3-aminoacetanilide |
| 6 | aniline-3,5-disulphonic acid |
| 7 | 3-amino-4-methylbenzene sulphonic acid |
| 8 | 4-β-sulphatoethylsulphonylaniline |
| 9 | 3-β-sulphatoethylsulphonylaniline |
| 10 | 5-sulphoanthranilic acid |
| 11 | phenol |
| 12 | phenol-4-sulphonic acid |
| 13 | 5-aminoanaphthalene-1-sulphonic acid |
| 14 | 6-aminonaphthalene-1-sulphonic acid |
| 15 | 6-aminonaphthalene-1,3-disulphonic acid |
| 16 | 5-aminonaphthalene-2,4,7-trisulphonic acid |
| 17 | methylamine |
| 18 | ethanolamine |
| 19 | N-methyltaurine |
| 20 | 4-aminobenzoic acid |
| 21 | N-ω-sulphomethylaniline |
| 22 | ethylene diamine (½ mole) |
| 23 | 2,6-diaminonaphthalene-4,8-disulphonic acid (½ mole) |
| 24 | m-phenylenediamine (½ mole) |
| 25 | p-phenylenediaine sulphonic acid (½ mole) |
| 26 | benzidine-2,2'-disulphonic acid (½ mole) |

| I | II |
|---|---|
| 27 | 4,4'-diaminodiphenylurea-2,2'-disulphonic acid (½ mole) |
| 28 | 4,4'-diaminodiphenylsulphone (½ mole) |

EXAMPLE 29

4,6-Diaminobenzene-1,3-disulphonic acid (2.68 parts) are reacted with cyanuric chloride (2.1 parts) and the product diazotised as described for Example 1. 7-Amino-1-hydroxynaphthalene-3,6-disulphonic acid (3.19 parts) are added and the mixture is stirred at 0°–5° C., pH 1–1.5 for 3 hours. 2 N Sodium carbonate solution is added until the pH of the solution is at 6.5. The product is isolated by the addition of potassium chloride, collected by filtration and pasted with potassium dihydrogen orthophosphate (1 part) and disodium hydrogen orthophosphate (0.5 part) before being dried. When applied to cellulosic fibres in conjunction with an acid-binding agent, the fibres are dyed in bluish-red shades with high light fastness.

The cyanuric chloride in the above Example can be replaced by an equivalent quantity of the acylating agent named in Column II of the following Table to yield bluish-red dyestuffs having very similar properties.

| I | II |
|---|---|
| 30 | cyanuric bromide |
| 31 | 2,4-difluoro-6-(3-sulphophenylamino)-s-triazine |
| 32 | tetrachloropyrimidine |
| 33 | tetrabromopyrimidine |
| 34 | 5-cyano-2,4,6-trichloropyrimidine |
| 35 | 5-chloro-2,4,6-trifluoropyrimidine |
| 36 | 5-nitro-2,4,6-trichloropyrimidine |
| 37 | 2,4-dichloro-6-methoxy-s-triazine |
| 38 | 2,4-dichloro-6-isopropoxy-s-triazine |
| 39 | 2,4-dichloro-6-butoxy-s-triazine |
| 40 | 2,4-dichloro-6-β-methoxyethoxy-s-triazine |
| 41 | carbyl sulphate |
| 42 | chloroacetyl chloride |
| 43 | acryloyl chloride |
| 44 | α,β-dichloropropionyl chloride |
| 45 | 2,2,3,3-tetrafluorocyclobutane carbonyl chloride |
| 46 | β-(2,2,3,3-tetrafluorocyclobutyl)acryloyl chloride |
| 47 | 2,3,3-trifluorocyclobut-1-ene carbonyl chloride |
| 48 | β-(2,3,3-trifluorocyclobut-1-enyl)acryloyl chloride |
| 49 | β-chloroethylsulphonyl-endo-methylene cyclohexane carbonyl chloride |
| 50 | 2,3-dichloroquinoxaline-s-(6)sulphonyl chloride |
| 51 | 2,3-dichloroquinoxaline-s-(6)carbonyl chloride |
| 52 | 2,4-dichloroquinazolin-6(7)sulphonyl chloride |
| 53 | 2,4,6-trichloroquinazolin-7(8)sulphonyl chloride |
| 54 | 2,4,7(8)-trichloroquinazolin-6-sulphonyl chloride |
| 55 | 2,4-dichloroquinazolin-6-carbonyl chloride |
| 56 | 1,4-dichlorophthalazine-6-carbonyl chloride |
| 57 | 4,5-dichloropyridazon-1-yl-ethylcarbonyl chloride |
| 58 | 2,4-dichloropyrimidine-5-carbonyl chloride |
| 59 | 4-(4,5-dichloropyridaz-6-on-1-yl)benzoyl chloride |
| 60 | 2-chlorobenzthiazole-6-carbonyl chloride |
| 61 | 3,6-dichloropyrazin-4-carbonyl chloride |
| 62 | 4-(4,5-dichloropyridaz-6-on-1-yl)phenylsulphonyl chloride |
| 63 | 5-cyano-2,4,6-trifluoropyrimidine |
| 64 | 4,5-dichloro-6-methyl-2-methylsulphonylpyrimidine |

EXAMPLE 65

2.98 parts of 6-amino-4-nitrobenzene-1,3-disulphonic acid are stirred in water (50 parts) and hydrochloric acid (s.g.=1.18, 5 parts) at 0° C. and diazotised by the addition of 5 parts of 2 N sodium nitrite solution. 3.19 Parts of 7-amino-1-hydroxynaphthalene-3,6-disulphonic acid are added and the mixture is stirred for 3 hours at 0°–5° C., pH 1–1.5. The pH is raised to 7 by the dropwise addition of 2 N sodium carbonate solution and the solution is stirred at 40°–50° C. while sodium sulphide is added in 0.5 part portions at 10 minute intervals until the reduction is complete. The product is isolated by addition to a large volume of acetone, collected by filtration and dried. It is stirred in a mixture of water (25 parts), ice (25 parts) and dispersing agent (0.5 part) and a solution of cyanuric chloride (2.5 parts in acetone (10 parts) is added. The mixture is stirred for 3 hours at 0°–5° C., pH 6–7, screened and the product isolated by addition of potassium chloride. After collecting by filtration and pasting with potassium dihydrogen orthophosphate (1 part) and disodium hydrogen orthophosphate (0.5 part) the product is dried. It is the same as that described in Example 29.

EXAMPLES 66–101

Cyanuric chloride in the above Example 65 can be replaced by any of the compounds listed under Examples 30–64 to yield similar dyes to those described.

EXAMPLE 102

The procedure of Example 2 is followed replacing the 2 parts of metanilic acid by 2.2 parts of 2,4-diaminobenzene sulphonic acid. The product so obtained is added to a stirred mixture of water (50 parts), ice (25 parts) and cyanuric chloride (3 parts) and the mixture stirred at 0°–5° C., pH 6–7 for 5 hours. It is screened and the clear filtrate is stirred with ammonia (5 parts) at 40° C. for 1 hour. The product is isolated by the addition of potassium acetate, collected by filtration, washed with 400 parts of methylated spirits and dried. When applied to cellulosic fibres in conjunction with an acid-binding agent, the fibres are dyed a bluish-red shade with good fastness.

The dyestuffs in the accompanying Table are prepared similarly by sequential reaction of 2-amino-1-[3-(2,4-dichloro-s-triazin-6-ylamino)-4,6-disulphophenylazo]-8-hydroxynaphthalene-3,6-disulphonic acid with the diamino named in Column II, the with the acylating agent named in Column III and finally with the compound named in Column IV.

| I | II | III | IV |
|---|---|---|---|
| 103 | 2,4-diaminobenzene sulphonic acid | 2,4-dichloro-6-methoxy-s-triazine | — |
| 104 | " | 2,4,6-trifluoro-5-chloropyrimidine | — |
| 105 | 2,5-diaminobenzene sulphonic acid | " | — |
| 106 | " | 2,4,6-trifluoro-5-chloropyrimidine | — |
| 107 | " | 2,4,6-trichloro-5-cyanopyrimidine | — |
| 108 | " | cyanuric chloride | metanilic acid |
| 109 | 2,5-diaminobenzene disulphonic acid | " | n-butylamine |

All these dyes colour cellulose red when applied with an acid-binding agent.

EXAMPLE 111

7.3 Parts of the product prepared as described in Example 1, 1.8 parts of nicotinic acid and 50 parts of water are stirred and the pH adjusted to 9 with 2 N sodium carbonate solution. The solution is stirred under reflux until quaternisation is complete (1½-2 hours). The solution is cooled and the product is isolated by the addition of potassium acetate, collected by filtration, washed with 200 parts of methylated spirits and dried. When applied to cellulosic fibres in conjunction with an acid-binding agent, the fibres are dyed in bluish-red shades with good fastness, especially to light.

EXAMPLES 112-116

The nicotinic acid in the above Example 111 can be replaced by equivalent quantities of pyridine, isonicotinic acid, 3- or 4-picoline, or diazabicyclooctane to yield similar dyes.

EXAMPLE 117

7.3 Parts of the product prepared as described for Example 1, 2.5 parts of sodium sulphite, 0.25 part of pyridine and 50 parts of water are stirred at 70° C. until sulphiting is complete, as judged by the liberation of ionic chlorine. The solution is cooled and the product is isolated by the addition of potassium acetate, collected by filtration, washed with 200 parts of methylated spirits and dried. When applied to cellulosic fibres in conjunction with an acid-binding agent, the fibres are dyed in bluish-red shades of good fastness, especially to light.

EXAMPLE 118

7.5 Parts of the product prepared as in Example 29 are stirred with water (100 ml.) and n-butylamine (7 ml.) at 40° C. for 1 hour. The product is isolated by salting out with potassium acetate, and is found to colour cellulosic fibres, when applied in conjunction with an acid-binding agent, in bright bluish-red shades fast to light.

EXAMPLES 119-129

The n-butylamine of the above Example 118 can be replaced by equivalent amounts of the following amines:

isopropylamine, dimethylamine, diethylamine, diethanolamine, piperidine, morpholine, N-ethylbutylamine, N-methyl-β-cyanoethylamine, N-butylethanolamine and di-β-cyanoethylamine to yield similar dyes.

EXAMPLE 130

The 2 parts of metanilic acid in Example 2 are replaced by 2.2 parts of N-methylmetanilic acid to gove a dyestuff of very similar properties to that described in Example 2. The dyes in the following Table can be made in a similar way, N-methylmetanilic acid being replaced by an equivalent quantity of the amine named in Column 2.

| I | II |
|---|---|
| 131 | N-ethylsulphanilic acid |
| 132 | N-β-carboxyethylaniline |
| 133 | N-β-hydroxyethylmetanilic acid |
| 134 | N-β-cyanoethyl-m-toluidine |
| 135 | 2-amino-terephthalic acid |
| 136 | 4-ethylaniline |
| 137 | o-anisidine-4-sulphonic acid |
| 138 | o-phenetidine |
| 139 | 2-chlorosulphanilic acid |
| 140 | 2,5-dichloroaniline |
| 141 | 2-bromometanilic acid |
| 142 | 4-aminobenzonitrile |
| 143 | 3-nitroaniline-4-sulphonic acid |
| 144 | 5-nitroanthranilic acid |

-continued

| I | II |
|---|---|
| 145 | 3-aminoacetanilide-4-sulphonic acid |

We claim:
1. A reactive dyestuff of the formula:

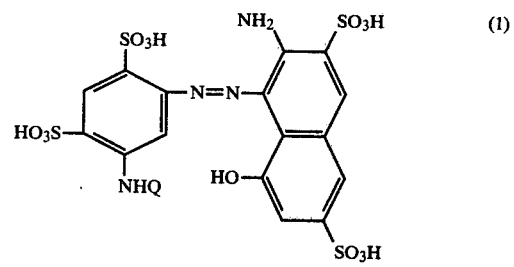

wherein Q represents a cellulose reactive group selected from
dichloro-5-cyanopyrimidinyl
dichloro-5-nitropyrimidinyl
trichloropyrimidinyl
difluoro-5-chloropyrimidinyl
difluoro-5-cyanopyrimidinyl and
triazinyl groups of the formula:

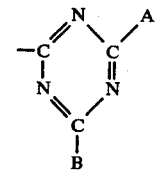

where A is selected from F, Br and Cl
B is selected from F, Br, Cl, $C_{1-4}$ alkoxy $C_{1-4}$ alkoxy, phenoxy, sulphophenoxy, $C_{1-4}$ alkylamino, $C_{1-4}$ alkylamino in which the $C_{1-4}$ alkyl is substituted by $SO_3H$, OH or CN; di($C_{1-4}$ alkyl) amino, di($C_{1-4}$ alkyl) amino in which one or both the $C_{1-4}$ alkyl substituted by $SO_3H$, OH or CN; cyclohexylamino, morpholino, piperazino, mono-, di-, trisulphonaphthylamino or a group of the formula:

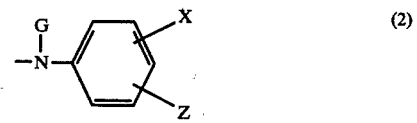

where G=H, methyl, ethyl, ω-sulphomethyl, β-carboxy-β-hydroxy- or β-cyanoethyl and Z and X are each independently selected from H, COOH, $SO_3H$, $CH_3$, $C_2H_5$, $OC_2H_5$, Cl, Br, CN, $NO_2$, $NHCOCH_3$.

2. A dyestuff as claimed in claim 1 in which A is Cl.
3. A dyestuff as claimed in claim 1 having the formula:

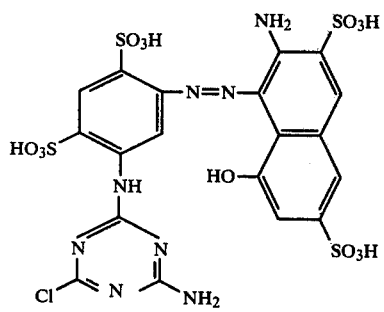

* * * * *